(12) United States Patent
Bea

(10) Patent No.: US 11,618,101 B2
(45) Date of Patent: Apr. 4, 2023

(54) WEAR-RESISTANT SLEEVE FOR A GAS NOZZLE FOR ENCAPSULATING A CUTTING GAS JET

(71) Applicant: TRUMPF Werkzeugmaschinen GmbH + Co. KG, Ditzingen (DE)

(72) Inventor: Martin Bea, Kornwestheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 852 days.

(21) Appl. No.: 16/585,529

(22) Filed: Sep. 27, 2019

(65) Prior Publication Data

US 2020/0023464 A1 Jan. 23, 2020

Related U.S. Application Data

(63) Continuation of application No. PCT/EP2018/056985, filed on Mar. 20, 2018.

(30) Foreign Application Priority Data

Mar. 27, 2017 (DE) .......................... 102017205084.5

(51) Int. Cl.
| | |
|---|---|
| *B23K 26/14* | (2014.01) |
| *B23K 35/02* | (2006.01) |
| *C22C 9/00* | (2006.01) |
| *C22C 13/00* | (2006.01) |
| *C08L 71/00* | (2006.01) |

(52) U.S. Cl.
CPC ...... *B23K 26/1488* (2013.01); *B23K 26/1462* (2015.10); *B23K 35/0211* (2013.01); *C08L 71/00* (2013.01); *C22C 9/00* (2013.01); *C22C 13/00* (2013.01)

(58) Field of Classification Search
CPC ............ B23K 26/1488; B23K 26/1462; B23K 26/147; B23K 26/1494; B23K 26/0211; C08L 71/00; C22C 9/00; C22C 13/00
USPC ...................... 239/589, 533.1, 591; 428/683; 219/121.75, 121.84
See application file for complete search history.

(56) References Cited

U.S. PATENT DOCUMENTS

| | | | |
|---|---|---|---|
| 3,690,567 A | 9/1972 | Borneman | |
| 7,759,602 B2 * | 7/2010 | Mori | B23K 26/142 219/121.75 |

(Continued)

FOREIGN PATENT DOCUMENTS

| | | |
|---|---|---|
| CN | 103212495 | 7/2013 |
| CN | 103381396 | 11/2013 |

(Continued)

OTHER PUBLICATIONS

KR Office Action in Korean Appln. No. 10-2019-7031766, dated Jan. 20, 2022, 8 pages (with English translation).

(Continued)

*Primary Examiner* — William A Bolton
(74) *Attorney, Agent, or Firm* — Fish & Richardson P.C.

(57) ABSTRACT

In a sleeve for a gas nozzle, a sleeve main body and a sleeve end face is formed at least in part by a wear protection element which is fastened to the sleeve main body and which is composed of a more wear-resistant material than the sleeve main body adjoining the sleeve end face, an inner and/or an outer beveled portion of the sleeve end face are formed at least in part by the wear protection element.

22 Claims, 3 Drawing Sheets

(56) References Cited

U.S. PATENT DOCUMENTS

| | | | |
|---|---|---|---|
| 8,552,341 B2* | 10/2013 | Zamuner | B23K 9/295 219/137.61 |
| 9,610,652 B2 | 4/2017 | Jouanneau et al. | |
| 10,155,287 B2 | 12/2018 | Spiess et al. | |
| 2006/0078738 A1 | 4/2006 | Goto et al. | |
| 2007/0262060 A1* | 11/2007 | Roberts | H05H 1/34 219/121.5 |
| 2012/0234802 A1* | 9/2012 | Wahl | B23K 26/38 219/121.85 |
| 2015/0273628 A1* | 10/2015 | Jouanneau | B23K 26/1464 219/121.84 |
| 2015/0290742 A1 | 10/2015 | Jouanneau et al. | |
| 2016/0096238 A1* | 4/2016 | Spiess | B23K 26/142 219/121.7 |
| 2017/0042015 A1* | 2/2017 | Mather | H05H 1/34 |
| 2017/0189993 A1* | 7/2017 | Lefebvfre | B23K 26/14 |
| 2018/0043469 A1 | 2/2018 | Martin et al. | |

FOREIGN PATENT DOCUMENTS

| | | |
|---|---|---|
| CN | 203371169 | 1/2014 |
| CN | 105269152 | 1/2016 |
| DE | 19853735 | 3/2000 |
| DE | 202004011430 | 9/2004 |
| DE | 102013210844 | 9/2014 |
| DE | 102016215019 | 10/2016 |
| EP | 1502694 | 2/2005 |
| EP | 1629924 | 3/2006 |
| KR | 10-2015-0082258 | 7/2015 |
| WO | WO 2012/052523 | 4/2012 |
| WO | WO 2015/170029 | 11/2015 |
| WO | WO 2016/177595 | 11/2016 |
| WO | WO 2018/177804 | 10/2018 |

OTHER PUBLICATIONS

DE Office Action in German Appln. No. 102017205084.5, dated Feb. 9, 2018, 21 pages (with English translation).

PCT International Preliminary Report on Patentability in International Appln. No. PCT/EP2018/056985, dated Mar. 20, 2018, 7 pages.

PCT International Search Report and Written Opinion in International Appln. No. PCT/EP2018/056985, dated Jul. 24, 2018, 22 pages (with English translation).

CN Office Action in Chinese Appln. No. 201780070333.3, dated Dec. 3, 2020, 16 pages (with English translation).

* cited by examiner

WEAR-RESISTANT SLEEVE FOR A GAS NOZZLE FOR ENCAPSULATING A CUTTING GAS JET

CROSS REFERENCE TO RELATED APPLICATIONS

This application is a continuation of and claims priority under 35 U.S.C. § 120 from PCT Application No. PCT/EP2018/056985 filed on Mar. 20, 2018, which claims priority from German Application No. DE 10 2017 205 084.5, filed on Mar. 27, 2017. The entire contents of each of these priority applications are incorporated herein by reference.

TECHNICAL FIELD

The disclosure relates to a wear-resistant sleeve for a gas nozzle for encapsulating a cutting gas jet.

BACKGROUND

U.S. Pat. No. 9,610,652 B2 describes a sleeve for a gas nozzle including a sleeve main body and a sleeve end face that is formed at least in part by a wear protection element that is fastened to the sleeve main body and is composed of a more wear-resistant material than the sleeve main body adjoining the sleeve end face, and also to a gas nozzle for a laser processing head having such a sleeve.

The sleeve disclosed in U.S. Pat. No. 9,610,652 B2 has a sleeve main body, to the sleeve end face of which there is fastened a wear protection element in sleeve form made of electrically insulating ceramics material, such as, for example, $Al_2O_3$, AlN, ZrO or $Al_2TiO_5$, or of polymer material. The wear protection element protrudes several millimeters beyond the sleeve end face of the sleeve main body and protects the sleeve in a locally limited manner from damage mechanisms such as the melting temperature being exceeded or abrasion.

WO 2015/170029 A1 discloses a cutting gas nozzle which, for encapsulating the cutting gas jet, has a movable metal sleeve of a lead-containing bronze alloy. However, such a metal sleeve has an adverse effect on a capacitive distance control of the cutting gas nozzle relative to the workpiece surface during the cutting process. For capacitive distance control, the surface of the cutting gas nozzle and the surface of the metal sheet act as electrically conducting surfaces of a capacitor, to which a high-frequency alternating electrical voltage is applied during operation of the laser cutting installation. Changes in the electrical field strength between the two capacitor surfaces are continuously measured and used to adjust the distance between the cutting gas nozzle and the surface of the metal sheet ("capacitive distance control"). Changes in that electrical field by manipulations of the dielectric between the capacitor elements are thereby to be limited to a minimum to ensure trouble-free operation of the capacitive distance control.

The sleeve disclosed in WO 2016/177595 A1 is formed of an electrically non-conducting material, in particular of ceramics or plastics material, and therefore in the case of a metal oxide ceramics has only slight and in the case of a plastics material has no negative effects on the capacitive distance control, as long as the plastics material used has no or only traces of added dielectrically active materials. During operation of the gas nozzle, the front sleeve end face may be in direct mechanical contact with the workpiece surface to be processed, so that the front sleeve end face is subjected to wear.

At the beginning of a laser cutting process one drills through the workpiece to be processed by the focused laser beam ("piercing process"). During this piercing process, the metal of the workpiece that is locally melted by the laser beam escapes at high speed from the "start hole" that has just been produced, against the propagation direction of the laser beam. A cutting gas nozzle and the sleeve for encapsulating the cutting gas jet are therefore exposed during the piercing process to the molten droplets that escape from the pierced hole.

Some of the metal liquefied during the piercing process additionally adheres to the workpiece surface and leads locally to an increased surface temperature and roughness. Once the piercing process has taken place, operation changes immediately to the actual cutting operation, with the result that the front sleeve end face is placed, after the piercing process, onto the hot and rough workpiece surface and is then moved, with direct mechanical contact, over that hot and rough workpiece surface. The high temperature of the workpiece surface and the abrasive action of the adhering molten metal lead to wear of the front sleeve end face both when a brittle ceramics sleeve is used with a plastic sleeve.

During a laser processing process, such as a cutting or welding process, laser radiation reflected back from the workpiece surface and thermal radiation emitted diffusely from the cutting gap, or the molten pool leading to a thermal load inside the sleeve, which can lead to the melting temperature being exceeded and thus to damage.

SUMMARY

Encapsulating the space between the underside of a gas nozzle (e.g., a cutting gas nozzle) and the workpiece surface beneath the nozzle permits a reduction in the time required for a piercing process, a reduction in the gas pressure and thus simplification of the required gas infrastructure (e.g., low-pressure instead of high-pressure supply), a reduction in gas consumption, an increase in the processing speed, and a reduction in microroughness and burrs at a cut edge that is produced.

Advantages include providing an alternative sleeve for a gas nozzle without changing the dielectric properties of the sleeve in a manner that is unsuitable for the functional capability of a capacitive distance control. An inner and/or an outer beveled portion of the sleeve end face are formed at least in part by the wear protection element. The inner and/or the outer beveled portion of the sleeve end face can be formed solely by the wear protection element.

To be able to slide without being damaged over small steps in the workpiece surface, as can occur, for example, as a result of workpiece portions cut free by tipping, the front sleeve end face can have an inner and/or an outer beveled portion that is formed at least in part by the wear protection element. The wear protection element protects the sleeve tip of the front sleeve end face, which during operation is at the smallest distance from the workpiece surface. It therefore extends, starting from the sleeve tip, into the sleeve over at least 2 mm, e.g., over at least half, of the outer beveled portion and typically not more than 4 mm.

It has been recognized that sufficient protection of the sleeve against excessive stress by contact with molten structural or stainless steel and also against increased wear can be achieved if only the front sleeve end face, which is exposed and thus at risk of wear, is made at least in part of a wear protection material. The sleeve main body is thereby protected against direct contact with the partially liquefied workpiece material. The locally limited modification of the properties of a (the front) sleeve end face allows its period of use to be increased significantly, without higher-level properties of the sleeve (maximum electrical insulating resistance and dielectric neutrality) having to be limited or even given up completely in return.

For minimizing undesirable wear, both mechanical material properties (tensile strength/hardness) and thermal material properties (melting temperature) are of importance. The wear protection material should therefore optimally satisfy the requirements of minimal negative effects on the functioning of the capacitive distance control, no scratch formation on metal workpiece surfaces as a result of the sliding movement of the front sleeve end face over the workpiece surface, maximum dimensional stability and abrasion resistance, maximum degree of reflection and high-temperature resistance, and minimal tendency to adhesion of metal spatter.

The wear protection material advantageously has a melting temperature higher than 400° C., hardness and modulus of elasticity are at least as great as those of aluminum, thermal conductivity and reflectivity of infrared radiation at least as great as those of stainless steel, and tendency to the adhesion of metal spatter is at most as great as in the case of stainless steel.

The wear protection element can be made at least in part of a metal material, such as a copper alloy. Tin-phosphorus-bronze fulfils the requirements made in terms of wear resistance, especially since the high copper content of this material also meets the thermal requirements (high melting temperature, low adhesion of metal spatter) and the optical requirements (high degree of reflection). Equally suitable are aluminum alloys, copper-tellurium alloys, hard brass, or metal oxide or nitride.

The sleeve main body can be an electrically non-conducting material, such as a plastics material or of ceramics material (e.g., aluminum oxide). It has been shown that a temperature-resistant, thermoplastic plastics material (e.g., polyether ether ketone (PEEK)) is well suited as a base material for the sleeve, since plastics material has a higher resilience than ceramics material.

Important properties of the plastics material used include thermoplastic formability, freedom from fillers such as glass, carbon, solid lubricants, or coloring pigments, low specific density, high tensile modulus of elasticity and high tensile strength, high hardness, high melting and continuous operating temperature, high thermal conductivity, low dielectric constant, and non-combustibility.

The wall thickness of the wear protection element in an inner portion of the sleeve main body adjoining the sleeve end face can be less than half the wall thickness of the sleeve and not more than 2 mm, e.g., not more than 1.5 mm. By forming the wear protection element with as thin a wall as possible, the function of a capacitive distance control of the nozzle is not impaired. The axial length of the overlap region between the wear protection element and the sleeve main body can be between 1 mm and 3 mm. In this manner, on the one hand the inner portion of the sleeve main body is protected from scattered radiation and molten workpiece material, and on the other hand the function of the distance control is not impaired.

The wear protection element can be annular or tubular in shape, wherein the wear protection element and the sleeve main body can advantageously be fitted into one another.

There are a number of possibilities for the connection between the sleeve main body and the wear protection element. In some embodiments, the wear protection element is bonded to the sleeve main body by an adhesive that is high-temperature resistant and highly resilient.

In some embodiments, the wear protection element is connected to the sleeve main body by an interlocking and/or force-based connection. It is advantageous for the material used to be suitable for processing by machining or for forming processes, to be able to realize the force-based or interlocking connections between the sleeve main body and the wear protection element reproducibly and inexpensively. In the case of a wear protection element in tubular or sleeve form, a large joining surface is obtained, via which the wear protection element and the sleeve main body are in contact with one another. As a result, even only small radial joining stresses bring about a high sliding friction acting axially, which prevents the wear protection element from sliding out of the sleeve main body owing to the gravitational force, which also acts axially, and wall shearing stress forces of the gas flow. It is particularly advantageous if the wear protection element has on its outer circumferential surface a circumferential annular projection or a plurality of individual projections for producing the interlocking connection. In further embodiments, the sleeve main body can have an undercut (e.g., an annular groove) in its cylindrical inner surface, into which one or more projections of the wear protection element engage. This configuration is particularly suitable when the sleeve main body is made of non-thermoplastic material, for example, of ceramics material.

For capacitive distance control, it is desirable to influence the electromagnetic field between the nozzle surface and the workpiece surface as little as possible by the wear protection material. The wear protection element forms the front sleeve end face should be as thin or thin-walled as possible and be limited to those regions of the sleeve which, in normal operation, are subjected to a permanent thermal load by molten metal spatter (e.g., during the piercing operation) and by process emissions (e.g., during the cutting or welding operation) or to a mechanical load by collisions with the surface of the workpiece. The thickness (wall thickness) of the wear protection element in the inner, cylindrical portion of the sleeve main body can be less than half the wall thickness of the cylindrical portion of the sleeve main body. In the region of the front sleeve end face, on the other hand, the thickness of the wear protection element protruding beyond a circumferential flange of the sleeve main body is at least half, e.g., approximately $\frac{2}{3}$, of the thickness of the circumferential flange at the front end face of the sleeve, to ensure sufficient wear resistance. The wear protection element covers the circumferential flange completely, so that the best possible protection of the sleeve from scattered radiation or molten workpiece material is ensured.

In some embodiments, the surface portion of the sleeve on which the gas pressure acts in a forward direction towards the workpiece, is 1.2 to 1.4 as large as the surface portion of the sleeve on which the gas pressure acts in a backward direction away from the workpiece. As a result of this configuration, the sleeve, during operation of the nozzle, is pressed against the workpiece surface by the flowing gas sufficiently strongly that it is not lifted from the workpiece surface by the lifting action of the gas on the inner beveled portion of the sleeve. The lifting and pressing forces acting on the sleeve as a result of the gas pressure thus balance one another, so that the sleeve slides in as frictionless a manner as possible over the workpiece surface.

Further advantages and advantageous embodiments will become apparent from the description, the claims, and the drawing. Likewise, the features mentioned above and described hereinbelow can each be used on their own or in a plurality in any desired combinations. The embodiments shown and described are not to be interpreted as being an exhaustive list but instead are of exemplary nature to illustrate the disclosure.

DETAILED DESCRIPTION

Figure 1A:
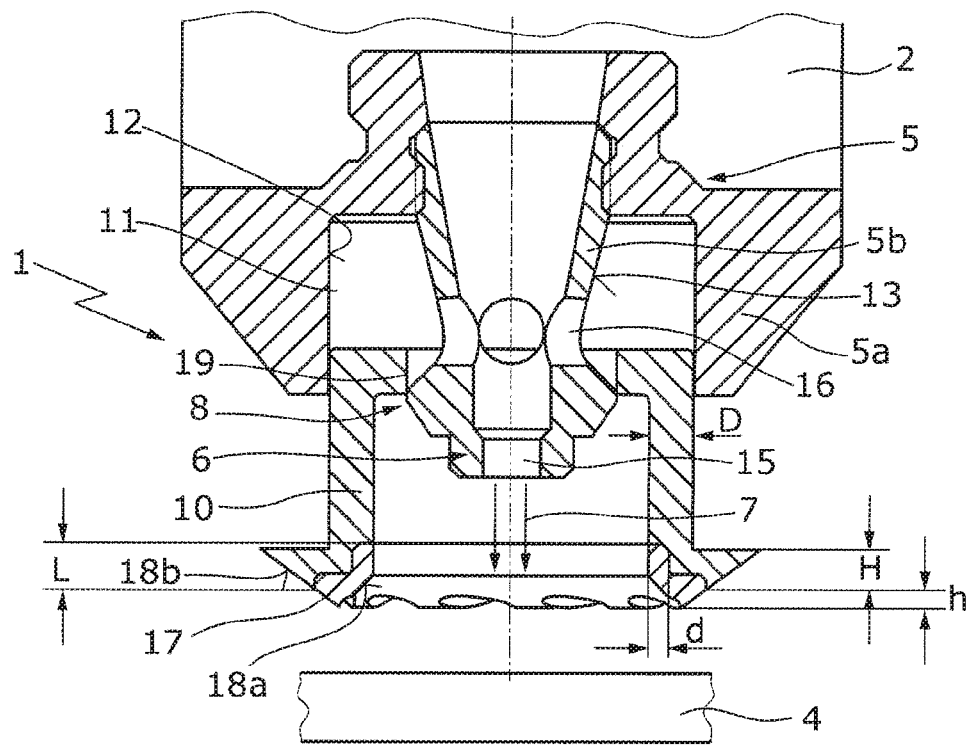
FIG. 1A shows a cutting gas nozzle having a displaceable sleeve in its advanced, front end position.
Figure 1B:
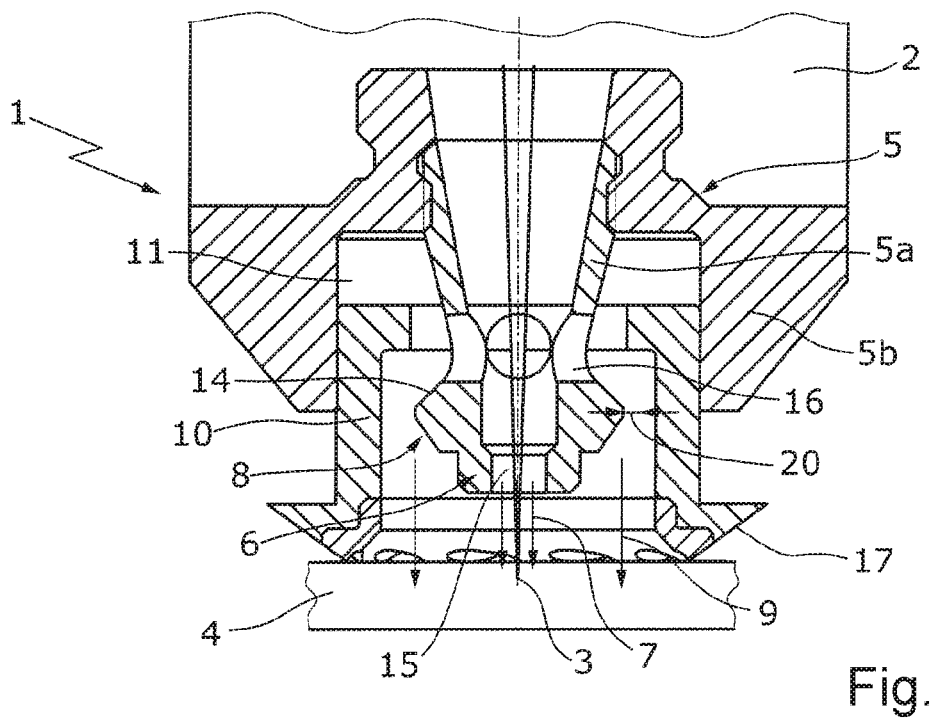
FIG. 1B shows the cutting gas nozzle of FIG. 1A in a pushed back, rear position.

The cutting gas nozzle 1 shown in FIG. 1A, 1B is on a laser processing head 2 and directs a cutting gas onto a workpiece 4 (e.g., metal sheet) processed by a laser beam 3. Such cutting gas nozzles 1 can be used, for example, on a laser processing machine as is disclosed in DE 10 2013 210 844 B3.

The cutting gas nozzle 1 includes a nozzle body 5 having an inner nozzle 6 for forming a core flow 7 and an annular gap nozzle 8 surrounding the inner nozzle 6 for forming an annular flow 9, as well as a sleeve 10 protruding beyond the inner nozzle 6. The nozzle body 5 is composed in two parts of an outer and an inner nozzle body 5a, 5b. The sleeve 10 is guided in the annular gap 11 of the annular gap nozzle 8, more precisely at the outer wall 12 of the annular gap 11, in such a manner that it is displaceable axially forwards and backwards. It is shown in FIG. 1A in its advanced, front end position and in FIG. 1B in a pushed back, rear position. On the inner wall 13 of the annular gap 11 (formed by the outer side of the inner nozzle 6) is a valve seat 14 on which the sleeve 10 rests in its front end position. The inner nozzle 6 is connected via its central nozzle opening 15 to a gas supply (not shown), and the annular gap 11 is connected via one or more connecting openings 16 to the nozzle opening 15. The laser beam 3 is directed through the nozzle opening 15 onto the workpiece 4.

To slide without being damaged over small steps in the workpiece surface (as can occur, for example, as a result of workpiece portions cut free by tipping) the front sleeve end face 17 of the sleeve 10 has a beveled portion 18a, 18b on the inside and/or on the outside.

In the front end position shown in FIG. 1A, the sleeve 10 is spaced apart from the workpiece 4 and rests in a sealing manner with an annular flange 19 on the valve seat 14, whereby the nozzle cross-sectional surface 20 of the annular gap nozzle 8 is largely closed. The cutting gas flowing from the laser processing head 2 into the cutting gas nozzle 1 is able to flow out substantially only through the central inner nozzle 6 as a core flow 7. This single-hole nozzle configuration is desirable for piercing of the laser beam 3 into the workpiece 4 or processing a thin metal sheet, when the laser processing head 2 and thus the inner nozzle 6 are at a large distance from the workpiece surface.

When the sleeve 10 is pushed back out of its front end position into the rear position shown in FIG. 1B, it lifts from the valve seat 14. The cutting gas is able to flow out via the connecting openings 16 into the annular gap 11 and, from there, through the nozzle cross-sectional surface 20, which is now free, as an annular flow 9. This supplementary flow nozzle, in which the cutting gas flows both out of the inner nozzle 6 and out of the annular gap nozzle 8, is desirable especially when cutting thick workpieces.

The sleeve 10 is pushed into its front end position by the cutting gas pressure when the valve sleeve 10 is not positioned on the workpiece 4. The sleeve 10 is pushed back by lowering the cutting gas nozzle 1 relative to the workpiece 4 by different distances, whereby the sleeve 10 rests on the workpiece surface and is pushed back into a rear position.

Figure 2A:
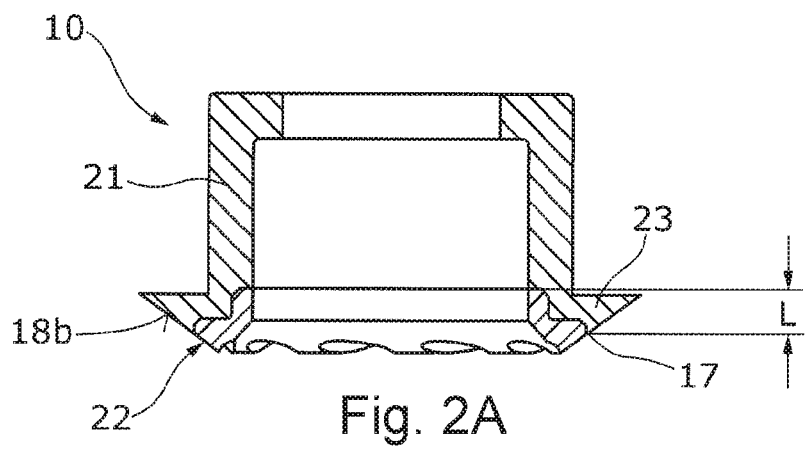
FIG. 2A shows details of the sleeve of FIGS. 1A-B.
Figure 2B:
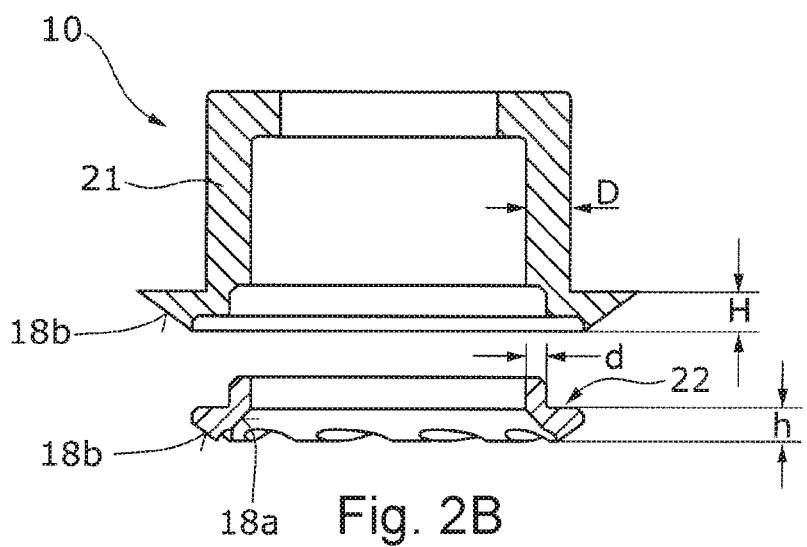
FIG. 2B shows the sleeve of FIG. 2A in a disassembled state.

As is shown in FIGS. 2A and 2B, the sleeve 10 has a sleeve main body 21 and, fastened thereto, an annular wear protection element 22 that forms part of the front sleeve end face 17. Alternatively, the inner and/or the outer beveled portions 18a, 18b of the sleeve end face 17 can also be formed solely by the wear protection element 22. The sleeve main body 21 is made of an electrically non-conducting material, such as a plastics material like PEEK, or of ceramics material. The wear protection element 22 is made of a more wear-resistant material, such as a metal material like tin-phosphorus-bronze, copper-tellurium, aluminum alloys, or hard brass. The wear protection element 22 and the sleeve main body 21 are fitted into one another, and the thickness (wall thickness) d of the wear protection element 22 in the inner, cylindrical portion of the sleeve main body 21 is less than half the wall thickness D of the sleeve 10. The wall thickness d of the wear protection element 22 is not more than 2 mm, e.g., not more than 1.5 mm, and the axial length L of the overlap region between the wear protection element 22 and the sleeve main body 21 is not less than 1 mm and not more than 3 mm.

The front end face 17 of the sleeve 10 is a circumferential flange 23, and the thickness (height) h of the wear protection element 22 protruding beyond the annular flange 23 corresponds to at least half the thickness (height) H of the circumferential flange 23. The wear protection element 22, which especially replaces the lower tip of the front sleeve end face 17, has the inner beveled portion 18a and extends into the sleeve 10, starting from the sleeve tip, over at least 2 mm of the outer beveled portion 18b and not more than 4 mm. The wear protection element 22 is bonded inwardly in the stepped sleeve opening of the sleeve body 21, for example by a high-temperature resistant and highly resilient adhesive, or is anchored in a force-based manner in the sleeve 10 owing to corresponding differences in diameter between the wear protection element 22 and the sleeve 10.

Figure 3:
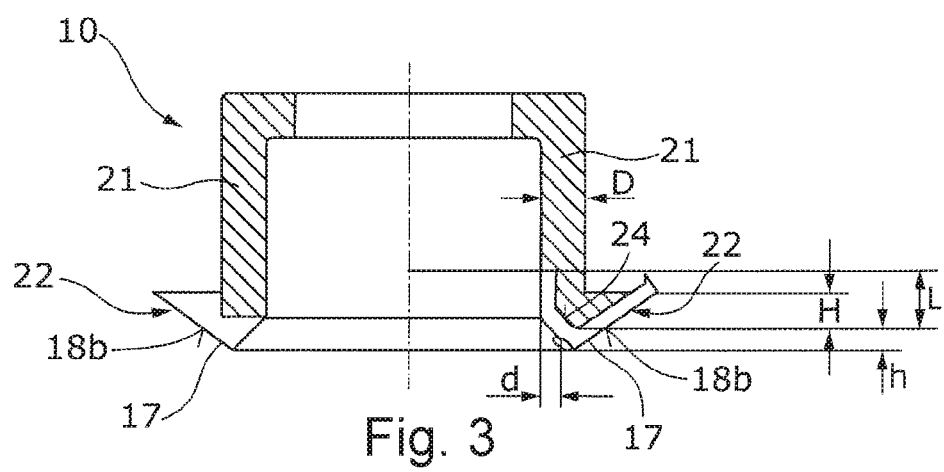
FIGS. 3 to 6 show further sleeve embodiments.

FIG. 3 shows two further sleeve embodiments, each embodiment shown one half of the sleeve, or half-section. The wear protection element 22 is adhesively bonded to the sleeve body 21. The outer beveled portion 18b is formed by the annular wear protection element 22. In the left half-section, the stepped wear protection element 22 is fitted externally to the sleeve body 21 and adhesively bonded to the planar end face of the sleeve body 21. In the right half-section, the wear protection element 22 is in the form of a cap with an approximately U-shaped insertion opening 24, with which it is fitted to the sleeve end of the sleeve body 21 and adhesively bonded thereto.

Figure 4:
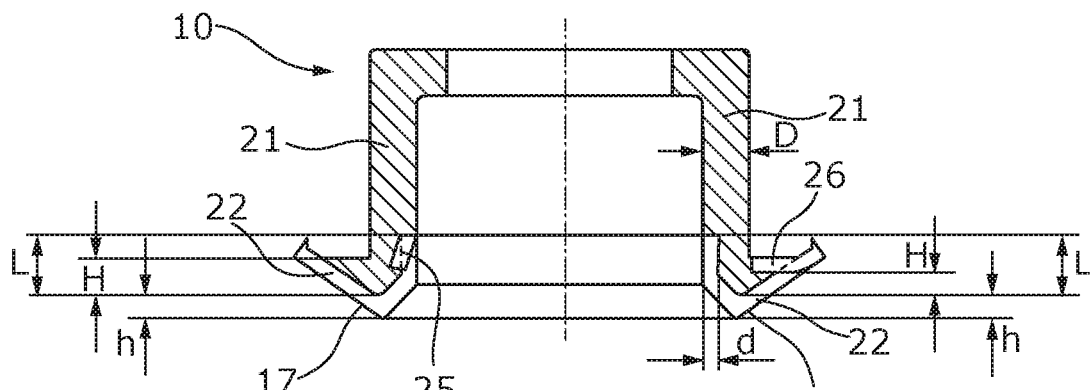

FIG. 4 shows two further sleeve embodiments in half-section. The wear protection element 22 is connected to the sleeve body 21 by an interlocking and force-based connection. The tubular-cylindrical form of the wear protection element 22 results in a large joining surface, via which the wear protection element 22 and the sleeve body 21 are connected together by a force-based connection in the assembled state. As a result, even only small radial joining stresses bring about a high sliding friction, acting axially, which prevents the wear protection element 22 from sliding out of the sleeve 10 owing to the gravitational force, which also acts axially, and wall shearing stress forces of the cutting gas flow. In the left half-section, the wear protection element 22 has at its inner upper edge a circumferential or a plurality of individual lugs 25 that engage radially outwards into a circumferential indentation correspondingly provided for that purpose in the opening wall of the sleeve body 21 and thus engage behind the sleeve body. In the right half-section, the wear protection element 22 has at its outer upper edge a circumferential or a plurality of individual lugs 26 that engage externally around an outer shoulder of the sleeve body 21 and thereby engage behind it.

Figure 5:
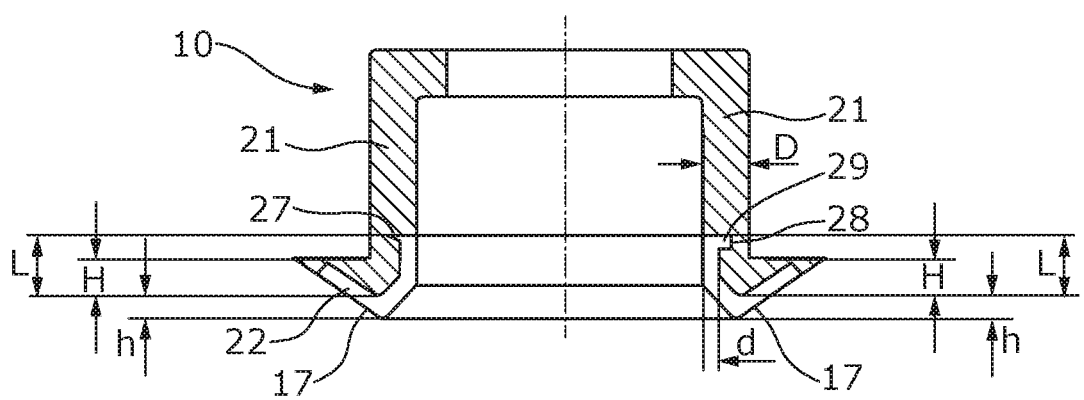

In the sleeve embodiment shown in the left half-section of FIG. 5, the wear protection element 22 has in its circumferential surface a circumferential, in particular hook-shaped projection 27 or a plurality of individual projections that are pressed into the opening wall of the sleeve body 21 and thus act as barbed hooks. The outside diameter of the projection(s) 27 is greater than the diameter of the sleeve opening of the sleeve main body 21, so that the material of the sleeve main body 21 flows around the projection(s) 27 at least on a microscopic scale owing to the internal stresses induced by the pressing in. An interlocking connection ("undercut") with the projection(s) 27 is thereby formed. In the sleeve variant shown in the right half-section of FIG. 5, the sleeve main body 21 has an annular groove 28 in its opening wall, into which a circumferential projection 29 or a plurality of individual projections engage in a locking manner. This variant is particularly suitable when the material of the sleeve main body 21 is not thermoplastic, that is to say, for example, is of ceramics material.

Figure 6:
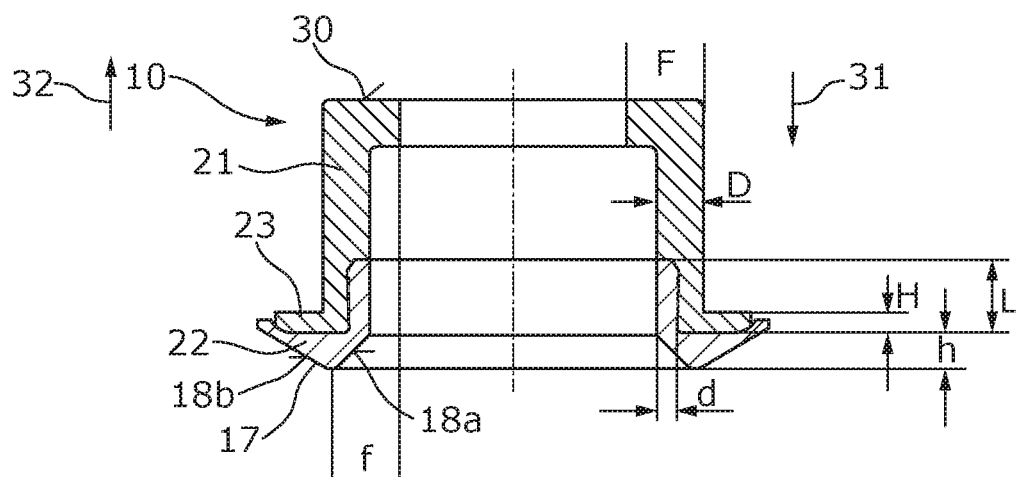

The sleeve 10 shown in FIG. 6 includes a sleeve main body 21 having a circumferential flange 23 and a wear protection element 22 that is fastened to the circumferential flange 23 and covers the circumferential flange 23 as a cap at its front side. The thickness h of the wear protection element 22 protruding beyond the annular flange 23 corresponds to at least half the thickness H of the circumferential flange 23. The wall thickness d of the wear protection element 22 in an inner portion of the sleeve main body 21 adjoining the sleeve end face is less than half the wall thickness D of the sleeve 10 and is not more than 2 mm, e.g., not more than 1.5 mm. The axial length L of the overlap region between the wear protection element 22 and the sleeve main body 21 is not less than 1 mm and not more than 3 mm. The surface portion F of the sleeve 10 on which the cutting gas pressure acts in a forward direction 31 towards the workpiece 4 is 1.2 to 1.4 as large as the surface portion f of the sleeve 10 on which the cutting gas pressure acts in a backward direction 32 away from the workpiece 4.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:
1. A sleeve for a gas nozzle, comprising:
   a sleeve main body; and
   a sleeve end face,
      wherein the sleeve end face is formed at least in part by a wear protection element composed of a more wear-resistant material than that of the sleeve main body,
      wherein one or both of an inner or an outer beveled portion of the sleeve end face is formed at least in part by the wear protection element, and
      wherein a surface portion of the sleeve on which a gas pressure of a gas acts in a forward direction when the sleeve is arranged inside a gas nozzle is 1.2 to 1.4 as large as the surface portion of the sleeve on which the gas pressure acts in a backward direction.

2. The sleeve of claim 1, wherein one or both of the inner or the outer beveled portion of the sleeve end face are formed solely by the wear protection element.

3. The sleeve of claim 1, wherein a wall thickness of the wear protection element in an inner portion of the sleeve main body adjoining the sleeve end face is less than half a wall thickness of the sleeve.

4. The sleeve of claim 1, wherein a wall thickness of the wear protection element in an inner portion of the sleeve main body adjoining the sleeve end face is less than 2 mm.

5. The sleeve of claim 4, wherein the wall thickness of the wear protection element in the inner portion of the sleeve main body adjoining the sleeve end face is less than 1.5 mm.

6. The sleeve of claim 1, wherein an axial length of an overlap region between the wear protection element and the sleeve main body is between 1 mm and 3 mm.

7. The sleeve of claim 1, wherein the wear protection element is formed at least in part of a material with a melting temperature higher than 400° C., a hardness and modulus of elasticity at least as great as those of aluminum, a thermal conductivity and reflectivity with respect to infrared radiation at least as great as those of stainless steel, and a tendency of adhesion of metal spatter is at most as great as that of stainless steel.

8. The sleeve of claim 1, wherein the wear protection element is formed at least in part of a metal material.

9. The sleeve of claim 8, wherein the metal material is a copper alloy, aluminum alloy, a metal oxide, or metal nitride.

10. The sleeve of claim 9, wherein the alloy is one of tin-phosphorus-bronze, copper-tellurium, or hard brass.

11. The sleeve of claim 1, wherein the sleeve main body is formed of an electrically non-conducting material.

12. The sleeve of claim 11, wherein the sleeve main body is formed of a plastics material or ceramics material.

13. The sleeve of claim 11, wherein the sleeve main body is formed of a thermoplastic material.

14. The sleeve of claim 11, wherein the sleeve main body is formed of polyether ether ketone.

15. The sleeve of claim 1, wherein the sleeve end face is formed in part by a circumferential flange of the sleeve main body on which the wear protection element is fastened.

16. The sleeve of claim 15, wherein a thickness of the wear protection element protruding beyond the circumferential flange corresponds to at least half a thickness of the circumferential flange.

17. The sleeve of claim 15, wherein the wear protection element covers the flange completely.

18. The sleeve of claim 1, wherein the wear protection element is annular or tubular in shape and comprises on an outer circumferential face one or more annular projections.

19. The sleeve of claim 1, wherein the wear protection element and the sleeve main body are fitted into one another.

20. The sleeve of claim 1, wherein the wear protection element is adhesively bonded to the sleeve main body.

21. The sleeve of claim 1, wherein the wear protection element is connected to the sleeve main body by an interlocking and/or force-based connection.

22. A gas nozzle for a laser processing head, comprising:
a nozzle body with an opening, and
a sleeve surrounding the opening that is guided on the nozzle body such that the sleeve is displaceable axially forwards and backwards and a sleeve end face of which protrudes beyond the nozzle body at least in a front end position,
   wherein the sleeve comprises a sleeve main body and the sleeve end face,
   wherein the sleeve end face is formed at least in part by a wear protection element composed of a more wear-resistant material than that of the sleeve main body,
   wherein one or both of an inner or an outer beveled portion of the sleeve end face is formed at least in part by the wear protection element, and
   wherein a surface portion of the sleeve on which a gas pressure of a gas acts in a forward direction when the sleeve is arranged inside the gas nozzle is 1.2 to 1.4 as large as the surface portion of the sleeve on which the gas pressure acts in a backward direction.

\* \* \* \* \*